June 24, 1930.   W. H. SCHULZE   1,766,150

PISTON

Filed Oct. 20, 1927

INVENTOR.
William H. Schulze
BY
ATTORNEY.

Patented June 24, 1930

1,766,150

UNITED STATES PATENT OFFICE

WILLIAM H. SCHULZE, OF DETROIT, MICHIGAN

PISTON

Application filed October 20, 1927. Serial No. 227,414.

My invention relates to a new and useful improvement in a piston and particularly a two-piece piston so arranged and constructed that the piston rings may be removed and replaced without disturbing the connection of the piston with the connecting rod.

It is an object of the present invention to provide a mechanism whereby this result can be obtained and a piston effected which is economical of manufacture, durable in structure, and highly efficient in use.

Another object of the invention is the provision of a novel means for locking the separable head against rotation relatively to the main body of the piston.

Another object of the invention is the provision of a novel and effective means of securing the piston rings in position.

Other objects will appear hereinafter.

The invention consists in the combination and arrangement of parts hereinafter described and claimed.

The invention will be best understood by a reference to the accompanying drawings which form a part of this specification and in which—

Figure 1:
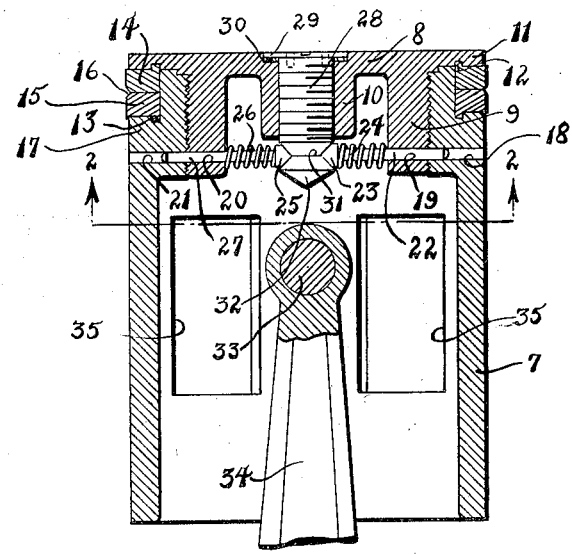
Fig. 1 is a central vertical sectional view of the invention.
Figure 2:
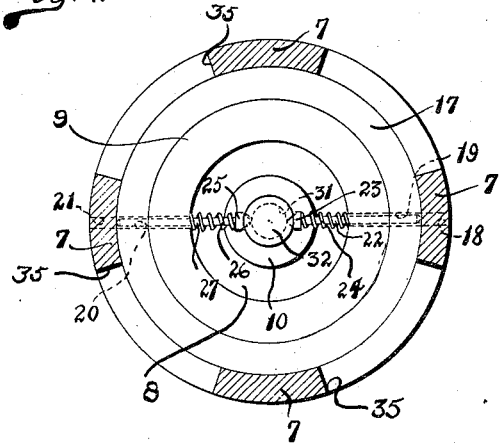
Fig. 2 is a sectional view taken on line 2—2 of Fig. 1.

In the drawings I have illustrated the pistons comprising a skirt 7, used with which is a detachable head 8 having the peripheral flange 9 projecting outwardly from one face thereof, and threaded on its periphery to thread into the upper or reinforced end of the skirt 7. Projecting centrally from one face of the head 8 is a sleeve 10. A flange 11 projects outwardly from the head 8 and is provided with the groove 12 registering with a groove 13 formed in the reinforced or upper part of the skirt 7, these grooves being adapted for the reception of ribs on the piston rings 14 and 15 which are positioned between the flange 11 and the shoulder 17 of the upper portion of the skirt 7. An oil groove 16 is formed by beveling the rings 14 and 15 at their meeting faces.

Formed in the upper or reinforced part of the skirt 7 is an opening 18 registering with an opening 19 formed in the flange 9. These openings 18 and 19 also register with the openings 20 and 21 formed in the flange 9 and in the upper portion of the skirt respectively. Slidably positioned in the openings 18 and 19 is a pin 22 having the tapered head 23 formed thereon to engage one end of the spring 24, the opposite end engaging the flange 9. A pin 27 is slidably mounted in the openings 20 and 21 and provided with the head 25 and the spring 26, these springs 24 and 26 serving normally to thrust the pins inwardly toward each other so as to move them out of engagement with the openings 18 and 21. Threaded in the sleeve 10 is a screw 28 having a head 29, beneath which is positioned a copper washer 30. A peripheral groove 31 is formed in the screw 28 in which engages the heads 23 and 25, this engagement of the heads 25 and 23 in the groove 31 preventing the movement of the pins 22 and 27 out of engagement with the openings 18 and 21. As shown in Fig. 1, the end 32 of the screw 28 is tapered.

When the parts are in the form shown in Fig. 1 an unthreading of the head 8 from the skirt 7 is prevented because of the engagement of the pins 22 and 27 in the openings 19 and 18 and the openings 20 and 21. In order to remove the head 8 from the skirt 7 the screw 28 must be first removed, the removal of this screw permitting the springs 24 and 26 to move the pins 22 and 27 inwardly toward each other, so as to clear the openings 18 and 21. When this disengagement of the pins from the openings 18 and 21 is effected, the head 8 may be threaded from the skirt 7. When it is desired to replace the head on the skirt after the rings 14 and 15 are in position, the head 8 will be threaded downwardly into position with the pins 22 and 27 engaging in the flange 9. A threading of the screw 28 downwardly will force the pins to move into the position shown in Fig. 1 so that a locking of the parts is provided.

In the drawings I have shown the skirt provided with a plurality of openings 35 which serve to lighten the piston and at the same time, afford a more efficient lubrication. The wrist pin 33 is shown as connected to the usual connecting rod 34.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. A piston of the class described, comprising: a skirt; a head threadable on said skirt; means projectable through said head and said skirt for preventing rotation of said head relatively to said skirt; resilient means for normally tending to move said retaining means out of operative position and radially inwardly of skirt; and means for resisting said resilient means.

2. A piston of the class described, comprising: a skirt; a head mounted upon and detachable from said skirt; a radially movable means for locking said head and said skirt in fixed relation; resilient means for normally tending to move said locking means radially inwardly of said skirt and into inoperative position; and a screw for resisting said resilient means.

3. A piston of the class described comprising: a skirt; a detachable head threaded on said skirt, said head projecting inwardly of said skirt adjacent its upper end, the inwardly projecting portion of said head having openings aligning with openings formed in said skirt; pins slidably mounted in said openings for preventing relative rotation of said head and said skirt; a spring mounted on each of said pins for normally moving said pins radially inwardly of said skirt and out of engagement with the openings in said skirt; and a screw threaded centrally through said head and normally preventing radial inward movement of said pins to inoperative position.

4. A piston of the class described comprising: a skirt; a detachable head threaded on said skirt, a portion of said head projecting inwardly of said skirt, said inwardly projecting portion having openings formed therein in alignment with openings formed in said skirt; a centrally disposed inwardly projecting interiorly threaded neck on said head; a screw threaded into said neck and projecting inwardly of said skirt, said screw being provided with a peripheral groove intermediate its ends to provide a head at its inner end, the walls of said groove being inclined; a pin slidably mounted in each of the openings in said inwardly projecting portion and engaging in the aligning opening in said skirt for preventing relative rotation of said head and said skirt; a head mounted on the inner end of each of said pins, said heads being adapted for engagement in said groove, said pins during the engagement of said heads in said grooves, projecting into the openings in said inwardly projecting portion and said skirt for preventing relative rotation of said head and said skirt; resilient means normally pressing said pins inwardly and effecting upon removal of said screw from engagement with said heads, radial inward movement of said pins so as to disengage from the openings in said skirt.

In testimony whereof I have signed the foregoing specification.

WILLIAM H. SCHULZE.